United States Patent [19]

Anderson

[11] 3,723,590

[45] Mar. 27, 1973

[54] METHOD FOR TERMINATING AN ELECTRICAL COMPONENT

[75] Inventor: Robert P. Anderson, Rixford, Pa.

[73] Assignee: Corning Glass Works, Corning, N.Y.

[22] Filed: Mar. 31, 1971

[21] Appl. No.: 129,765

Related U.S. Application Data

[63] Continuation-in-part of Ser. No. 736,172, June 11, 1968.

[52] U.S. Cl. ........................264/104, 29/629, 29/628, 29/621, 29/602, 29/25, 29/42, 29/630 G, 164/108, 164/110, 264/104

[51] Int. Cl. ............................H01r 43/00, H01c 1/14

[58] Field of Search....29/628, 621, 629, 602, 630 G, 29/25.42; 164/108, 110; 264/104, 262

[56] References Cited

UNITED STATES PATENTS

| | | | |
|---|---|---|---|
| 454,430 | 6/1891 | Greenfield | 164/108 |
| 2,149,702 | 3/1939 | Maris | 164/108 X |
| 2,244,009 | 6/1941 | Hiensch et al. | 164/108 X |
| 3,381,371 | 5/1968 | Russel | 29/600 |

*Primary Examiner*—Richard J. Herbst

*Assistant Examiner*—Robert W. Church

*Attorney*—Clarence R. Patty, Jr. and Walter S. Zebrowski

[57] ABSTRACT

A method utilizing a cylindrically shaped cup having an apertured bottom through which a lead wire end portion is inserted into the interior thereof. An electrically conductive epoxy, solder, or other bonding material is deposited in the interior of the cup. The end of an electrical component to be terminated is inserted into the bonding material within the cup and held in a fixed position until the material solidifies thereby forming a low resistance bond between the component and the lead wire. After the bonding material has cured the cup is removed from the component by slipping it from the free end of the lead wire.

1 Claim, 4 Drawing Figures

INVENTOR.
Robert P. Anderson
BY
Walter S. Zebrowski
ATTORNEY

METHOD FOR TERMINATING AN ELECTRICAL COMPONENT

CROSS-REFERENCE TO RELATED APPLICATION

This application is a continuation-in-part of application Ser. No. 736,172 filed June 11, 1968.

BACKGROUND OF THE INVENTION

One difficulty that has been encountered in terminating electrical components, and particularly in attaching a terminal lead wire to the terminal electrode thereof, is that two separate joint forming operations are required. For example, in one usual method for terminating resistors, the end of a lead wire is welded onto an electrically conductive cap in a first operation, and thereafter, the cap is pressed onto the end of the component in a second operation. Such a terminating method is both time consuming and uneconomical.

Further, the operation of pressing the cap onto the component presents an additional difficulty where the component utilizes a fragile substrate which is susceptible to breakage.

SUMMARY OF THE INVENTION

Accordingly, it is an object of the present invention to provide a method for terminating electrical components wherein only a single joint forming operation between the terminal electrode and lead wire is required.

It is a further object of the present invention to provide a reliable method for terminating fragile bodied electrical components.

It is yet another object of the present invention to provide a low cost method of terminating electrical components wherein only a single rapidly accomplished step of joint forming is required.

Briefly, in accordance with the present invention, a cup, having an apertured bottom through which an end portion of a single strand conductive lead wire may be inserted, is provided. The lead wire end portion is inserted through the aperture into the interior of the cup. The cup is at least partially filled with an electrically conductive bonding material after which the end of the electrical component to be terminated is inserted into the cup and bonding material, the material being in an unsolidified state. The bonding material is solidified or cured thereby forming an electrically conductive bond between the lead wire end portion and the component. Thereafter the cup is removed from the component and lead wire. As is seen I have discovered a method for terminating electrical components in which the two separate joint forming operations are combined into a single economic and rapidly accomplished step which overcomes the prior art difficulties.

Additional objects, features and advantages of the present invention will become apparent to those skilled in the art from the following more detailed description and attached drawings on which, by way of example, only the preferred embodiment of the present invention is illustrated.

DETAILED DESCRIPTION OF THE PREFERRED EMBODIMENT

Figure 1:
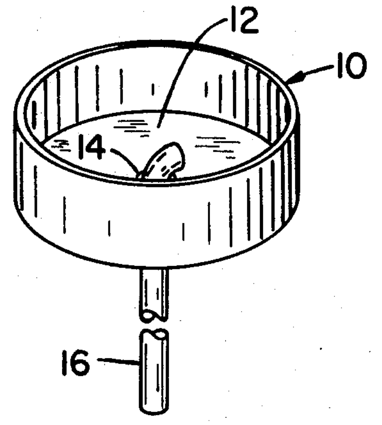
FIGS. 1 through 4 show various steps in the termination of an electrical component illustrating one embodiment of the present invention.
Figure 2:
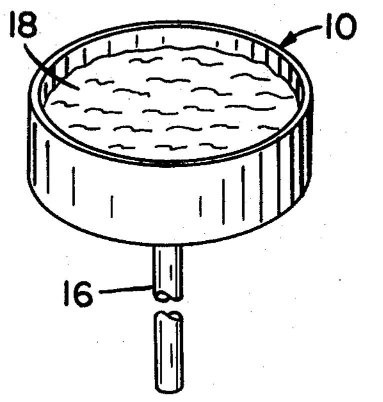

Referring to FIGS. 1 through 4 there is shown a cylindrically shaped cup 10 having a bottom 12 containing a hole 14 just large enough to insert an end portion of a single strand conductive terminal lead wire 16 therethrough into the interior of the cup 10. A bonding material 18 being electrically conductive and having the capability of forming a strengthened bond such as, for example, an electrically conductive epoxy resin is deposited in cup 10 to a level above the end portion of lead wire 16. Other examples of a bonding material 18 suitable for use in the present invention include silver, solder, electrically conductive metals, alloys thereof, electrically conductive cements, and the like.

Where an epoxy substance is employed as the bonding material 18, the interior surfaces of cup 10 may be coated with any suitable and well known releasing agent such as wax, polyethylene, or the like prior to depositing the material 18 in order to facilitate removal of cup 10 once the termination is formed.

After depositing material 18 in cup 10 the end of an electrical component 20 to be terminated is inserted into cup 10 and held in a fixed position until the bonding material cures or solidifies. Solidified bonding material 18 bonds the end of lead wire 16 to the terminal end of component 20 thereby providing an electrical connection between the lead wire and the electrical component, that is, there is direct electrical continuity from the lead wire through the bonding material to the electrically functional portion of component 20. Thereafter the cup 10 is removed from about component 20 by slipping it off the free end of lead wire 16 as illustrated in FIG. 4.

Figure 3:
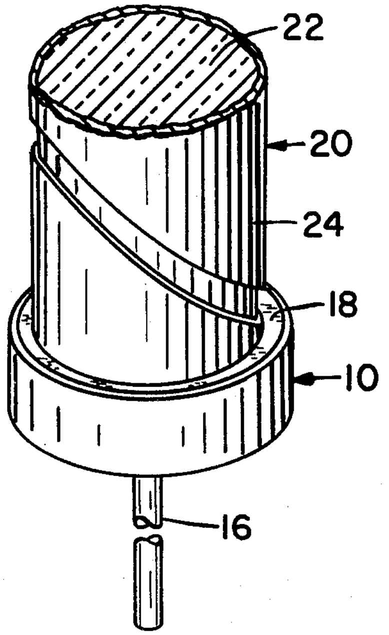
Figure 4:
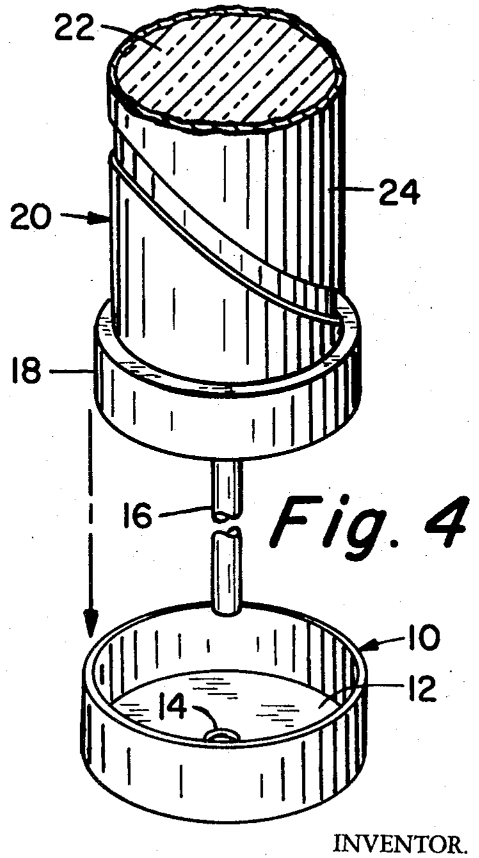

Component 20 is shown in FIGS. 3 and 4 to be a thin film spiraled resistor, that is a resistor formed of a dielectric substrate 22 to which is applied a thin resistive film 24. Such resistors are well known in the art. Obviously, other electrical components or devices such as other resistors, capacitors, inductors, and the like are equally suitable for the purposes of the present invention.

Where electrical solder is employed as bonding material 18, it should be deposited in cup 10 in either a solid or liquidous state and thereafter heated to a temperature of at least 315° C so as to render it liquidous until the terminal end of component 20 can be inserted therein. After so inserting component 20, the heat is removed thus enabling the solder to cool and solidify to form the termination. As previously mentioned cup 10 is removed after bonding material 18 has solidified.

Although the present invention has been described with respect to specific details of certain embodiments thereof, it is not intended that such details be limitations on the present invention except insofar as set forth in the following claims.

I claim:

1. A method for bonding a single strand conductive lead wire to an electrical component comprising the steps of providing said electrical component, providing a single strand conductive lead wire with engaging means on one end portion thereof, providing a cup having an apertured bottom to permit insertion of an end portion of said single strand conductive lead wire therethrough, coating the interior surfaces of said cup with a releasing agent, inserting one end portion of said single strand conductive lead wire through said aperture in the bottom of said cup, at least partially filling said interior of said cup with electrically conductive bonding material selected from the group consisting of electrically conductive epoxy and electrically conductive cement, thereafter inserting the portion of said electrical component to be terminated into said electrically conductive bonding material in said cup, said electrically conductive bonding material being in an unsolidified or uncured state, then solidifying said electrically conductive bonding material within said cup about said end portion of one single strand conductive lead wire and electrical component whereby said solidified electrically conductive bonding material bonds said single strand conductive lead wire to said electrical component and substantially solely provides an electrical connection therebetween, and thereafter removing said electrical component, solidified electrically conductive bonding material, and single strand conductive lead wire from said cup, said solidified electrically conductive bonding material forming the sole structural connection between said electrical component and said single strand conductive lead wire.

* * * * *